C. A. THOMSON.
DOUGH MOLDING MACHINE.
APPLICATION FILED DEC. 10, 1914.
1,242,079.
Patented Oct. 2, 1917.
3 SHEETS—SHEET 1.
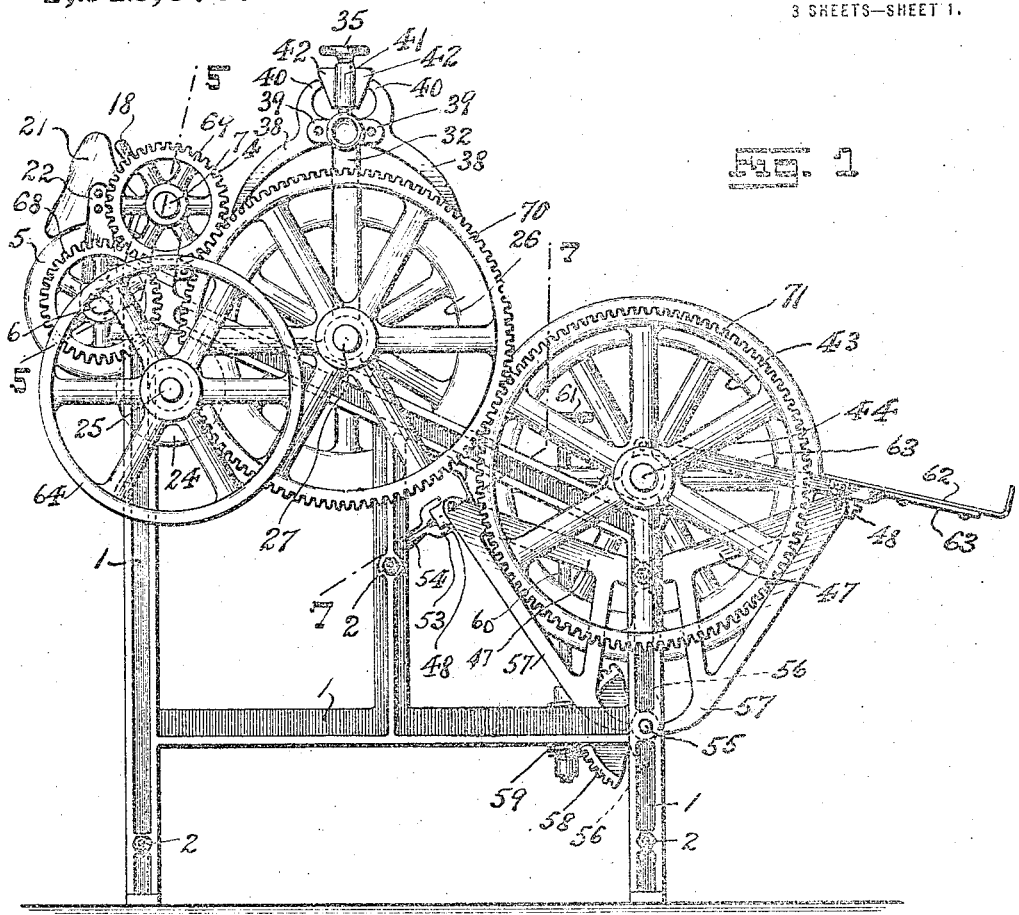
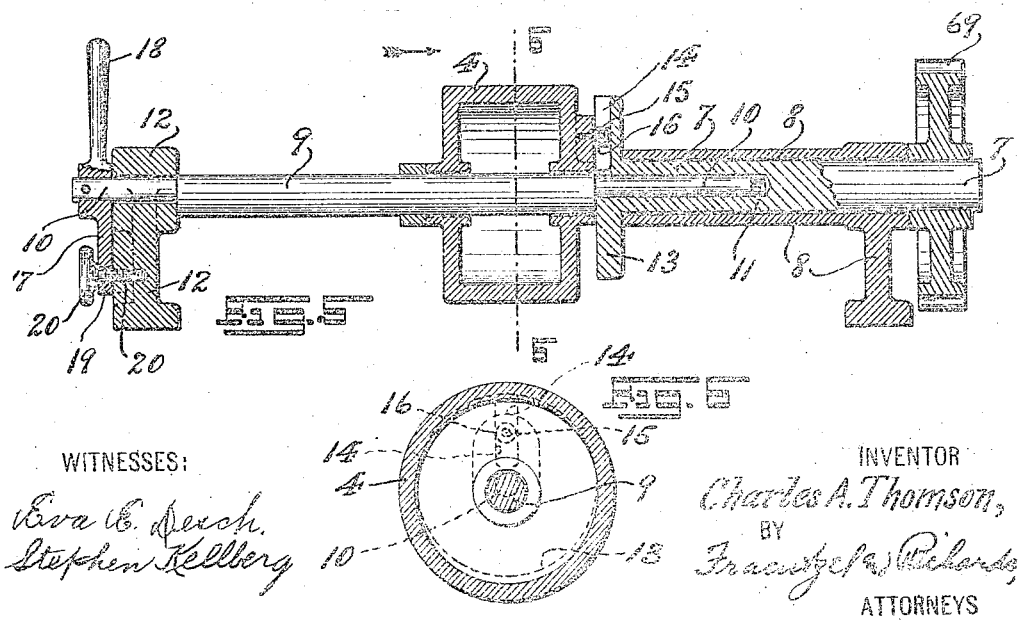
WITNESSES:
INVENTOR
Charles A. Thomson,
BY
ATTORNEYS

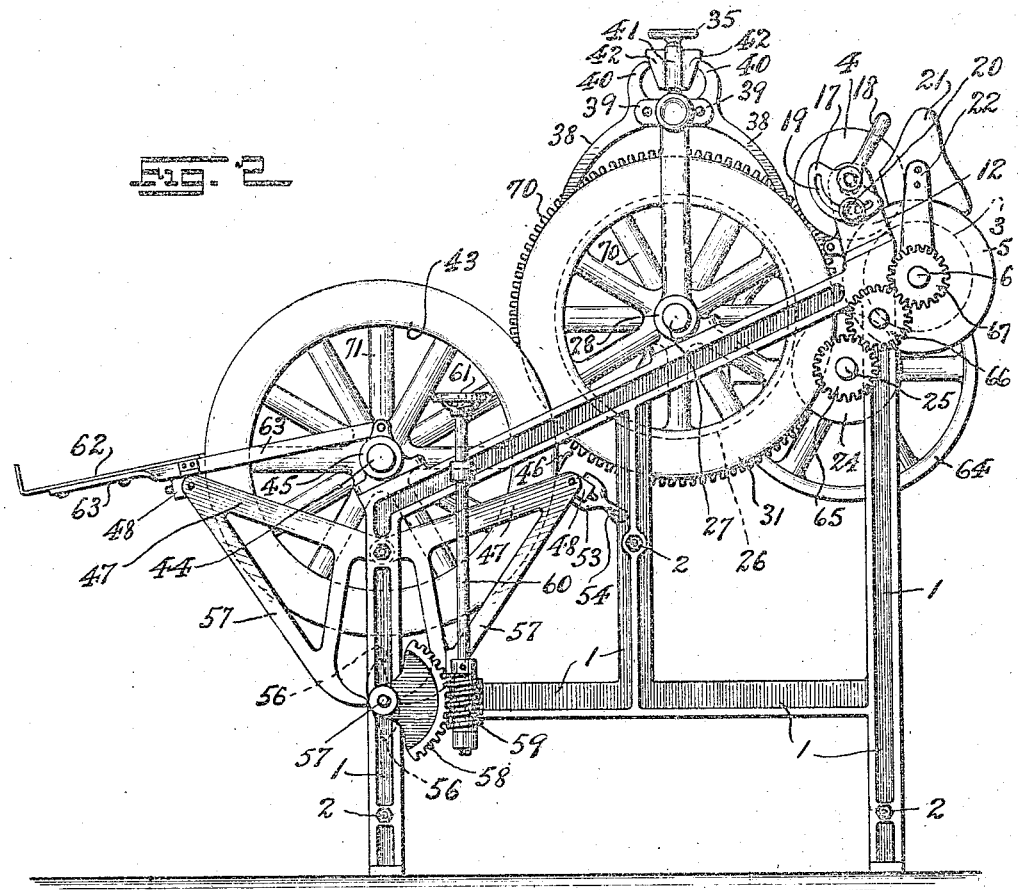

C. A. THOMSON.
DOUGH MOLDING MACHINE.
APPLICATION FILED DEC. 10, 1914.
1,243,079.
Patented Oct. 2, 1917.
3 SHEETS—SHEET 3.
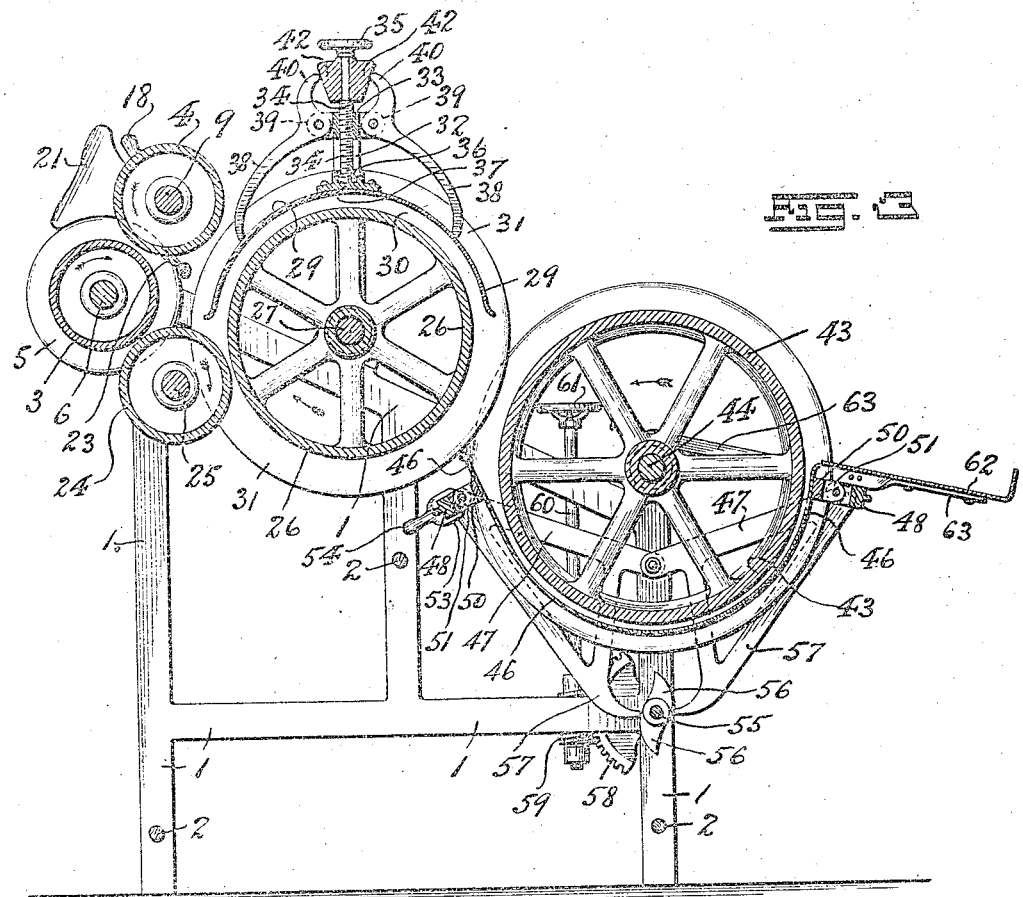
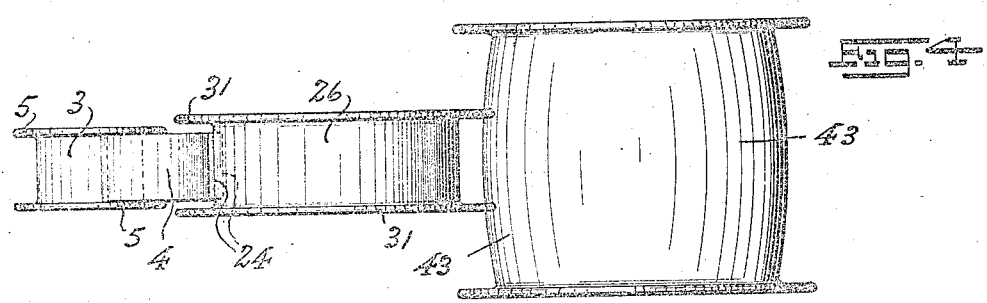
WITNESSES:
Eva E. Aesch
Stephen Kellberg
INVENTOR
Charles A. Thomson,
BY
Frantzel & Richards,
ATTORNEYS

UNITED STATES PATENT OFFICE.

CHARLES A. THOMSON, OF BELLEVILLE, NEW JERSEY, ASSIGNOR TO DANIEL MELLIS, OF BELLEVILLE, NEW JERSEY.

DOUGH-MOLDING MACHINE.

1,242,079.  Specification of Letters Patent.  Patented Oct. 2, 1917.

Application filed December 10, 1914. Serial No. 876,443.

*To all whom it may concern:*

Be it known that I, CHARLES A. THOMSON, a subject of the King of Great Britain, residing at Belleville, in the county of Essex and State of New Jersey, have invented certain new and useful Improvements in Dough-Molding Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in dough-molding machines; and, the said invention has reference, more particularly, to an improved construction of dough-molding machine the parts and mechanisms of which are all adjustably regulatable to arrange the machine for the molding of various sizes of dough portions for the production of different lengths and sizes of finished loaves.

The objects of the present invention are to provide in a dough-molding machine a novel and efficient correlation of the various mechanisms, whereby the several steps of the molding operations are efficiently accomplished; to provide a novel arrangement and construction of sheeting-rolls, the same being adjustable to roll the dough into a sheet of desired thickness; to provide a novel curling-drum together with an adjustable curling-plate coöperating therewith to curl up the sheet of dough conveyed from the sheeting-rolls; to provide a novel finishing drum together with an adjustable compression plate whereby the curled sheet of dough is compressed together to produce a proper length of dough portion ready to be placed in the baking pan, said finishing drum being of a convex conformation whereby the center of the dough portion is rolled slightly thinner than the end parts thereof, so that the longitudinal shrinkage of the dough portion after ejection from the machine does not thicken the dough portion unduly in the center, but rather brings up the center to uniform thickness with the ends of said dough portion.

Other objects of this invention not at this time more particularly enumerated will be clearly understood from the following detailed description of the present invention.

With the various objects of the present invention in view, the same consists, primarily, in the novel construction of dough-molding machines hereinafter set forth; and, the invention consists furthermore, in the novel arrangements and combinations of the various devices and parts, as well as in the details of the construction of the said parts, all of which will be more fully described in the following specification, and then finally embodied in the claims which are appended to and which form an essential part of the said specification.

The invention is fully illustrated in the accompanying drawings, in which:—

Figure 1 is an elevation of one side of the novel dough molding machine made according to and embodying the principles of the present invention; and Fig. 2 is an elevation of the opposite side thereof.

Fig. 3 is a longitudinal vertical section of the said novel dough-molding machine.

Fig. 4 is a detail top view of the sheeting-rolls, curling-drum, and finishing drum, illustrating the comparative widths and conformations of the same, as well as their relation one to another.

Fig. 5 is a detail transverse section taken on line 5—5 in said Fig. 1, and illustrating, more particularly, the means for adjusting the sheeting-rolls of the machine, said view being drawn on an enlarged scale; and Fig. 6 is a detail cross section taken on line 6—6 in said Fig. 5.

Fig. 7 is a detail transverse section taken on line 7—7 in said Fig. 1, the same illustrating the detachable connection between said compression-plate and the means for adjusting the same, said view being drawn on an enlarged scale.

Similar characters of reference are employed in all of the hereinabove described views to illustrate corresponding parts.

Referring now to the said drawings, the reference character 1 indicates the side frames of the machine upon which the operating mechanism is mounted, said side frames being properly spaced apart and secured together by the lateral tie-rods 2. Located at the forward upper end of the framework, thus provided, are a pair of oppositely rotated sheeting rolls 3 and 4, the lower roll 3 thereof having side flanges 5 between which the circumference of the upper roll 4 registers. Said roll 3 is fixed upon a laterally extending shaft 6 which is journaled in bearing members secured to said side frames 1. Said roll 4 is mounted so as to be adjustable toward and away from said roll 3, whereby the space between the coöperating rolls may be varied, as desired, to produce the different desired thickness of dough sheets. The means for so adjustably mounting said roll 4, and for driving the same in its variously adjusted positions, comprises a driving shaft 7, which is journaled in a suitable supporting bearing 8 attached to one of said side frames 1. The roll 4 itself is loosely mounted on a supporting shaft 9 which is provided at each end with journals 10 arranged eccentric to or offset from the axis of said shaft 9. Said shaft 9 is arranged to extend longitudinally and end to end with said driving shaft 7, and one of its journals 10 is mounted in a longitudinal bearing opening 11 formed in the inner end of said driving shaft 7 for the purpose of receiving the same, and the opposite journal 10 is mounted in a suitable bearing 12 secured to the opposite side frame 1. Connected with the inner end of said driving shaft 7 is a disk-portion 13 in the face of which is formed a radially disposed slot 14, and projecting from one side of said roll 4 is a stud 15 upon which is arranged an anti-friction roller 16 which is adapted to be engaged in and by said slot 14 so that a rotation of said driving shaft 7 and its disk-portion 13 is transmitted through the same to said roll 4, which is thereby caused to rotate upon said supporting shaft 9. Secured upon the end of the journal 10 at the outer end of said shaft 9 is a quadrant member 17 from which extends an operating handle 18, said quadrant member possesses a slot 19 formed concentric with said journal 10, and through which extends the shank of a locking-screw 20 which screws into said bearing 12, whereby said quadrant may be frictionally bound or locked, and consequently said shaft 9 may be also locked in a desired adjusted position. Of course it will be apparent that by rotating said shaft 9 on its eccentric journals 10, the axis of the former may be shifted so that the roll 4 will be carried or adjusted closer to or farther away from the roll 3 as desired, and this may be accomplished without in any way interfering with the driving relation of said disk-portion 13 to the roll 4, since the stud 15 and its roller 16 readily adjusts itself in the slot 14 of the disk-portion in accordance to the position to which the roll 4 is carried by such above described movements of the shaft 9.

A pair of guide-plates 21, supported by arms 22 which are secured to said side frames 1 or the bearings of the shaft 6, are registered with the pair of sheeting-rolls 3 and 4 whereby the dough to be operated upon is properly guided between said sheeting-rolls.

A scraper-blade 23 also operates in connection with said roll 4, to prevent any accidental riding of the dough around the sheeting-roll 4 after passing between the pair of sheeting rolls.

After passing through the sheeting-rolls 3 and 4, by means of which the portion of dough to be molded is rolled into a sheet, the sheet of dough drops upon a conveyer roll 24 which is mounted upon a transverse shaft 25. The said conveyer roll 24 carries the dough forward until it contacts with the surface of the curling-drum 26 which is mounted upon a transverse shaft 27 journaled in suitable bearing-portions 28 supported upon said side frames 1. Since the said curling-drum 26 and the conveyer roll 24 are rotated in the same direction, the end of the sheet of dough when engaged by the surface of the curling-drum 26 is turned over upon itself, and the sheet begins curling into convolute form. As such curling continues the curled end of the sheet of dough is engaged by the forward end of a curling-plate 29 which is mounted to extend over said curling-drum 26 and concentric thereto, and also spaced away from the surface of said curling-drum so as to provide a passage 30 through which the sheet of dough is moved and curled upon itself as it goes, for since the surface of the curling-drum moves and the curling-plate 29 remains stationary it follows that the latter holds back the dough and causes the same to turn over while the curling-drum feeds and carries it on. The said curling-plate 29 is adjustable as to its spacing from the surface of the curling-drum 26, and consequently as the rolled up sheet of dough increases in diameter during its passage over the curling-drum, said curling-plate 29 also exerts a pressure upon the roll of dough, and since the curling-drum is provided with annular flanges 31 which limit the endwise lengthening of the roll of dough, and consequently permits such a desired pressure to be exerted upon the roll as will work the convolutions of the sheet of dough properly together, according to the condition of the dough, whether the same be of light or stiff consistency.

Said curling-plate 29 is therefore mounted and provided with adjusting means whereby such adjustment toward and away from the surface of the curling drum 26 may be accomplished, so that the same may be positioned to operate upon the dough to shape and curl the same properly with relation to the size loaf ultimately desired.

This adjusting means comprises vertically extending side arms 32, which extend upwardly from the bearing-portions 28, or side frames 1 if desired, and which support a horizontal and transversely extending bridge-piece 33. Said bridge-piece 33 is provided with a centrally disposed internally screw-threaded opening in which is arranged an adjusting screw 34, which, by turning the hand-grip 35 of the same, may be caused to move up or down. The foot 36 of said screw 34 is connected in a socket-member 37, the latter being suitably secured to said curling-plate 29, so that the latter is thus coupled with said screw 34 and follows its vertical movements. By this means the curling-plate may be raised away from or moved toward the surface of the curling-drum 26 as desired. In order to maintain the curling-plate concentric to said curling-drum in all adjusted positions relative to the latter, there are provided a pair of lever arms 38, the free ends of which engage the respective free end portions of said curling-plate. These lever-arms 38 are pivoted between lugs or ears 39 projecting from each side of said bridge-piece 33, and the same are each provided with upwardly extending arms 40. Mounted upon the upper end of said adjusting-screw 34, so as to move up and down with the same, but maintained against turning therewith, is a cam-block 41 provided with downwardly and inwardly inclined cam-members 42 which respectively engage the free ends of said arms 40, consequently when said adjusting-screw 34 moves downward carrying therewith said curling-plate 29 toward the curling-drum 26, the said cam-members 42 move against and swing outwardly said arms 40 with the effect of moving downwardly against the free ends of said curling-plate 29 the ends of the lever-arms 38, and therefore swinging the ends of said curling-plate inwardly toward the curling-drum simultaneously with the movement of the central or main body of the former toward the latter, thus maintaining the concentric relation desired. Said curling-plate 29 is made, preferably, of sheet-metal possessing a sufficient degree of springiness or resiliency to permit the above described operation, and also to permit the return or opposite movement of the ends of said curling-plate when the latter is raised, and the pressure of the lever-arms 38 is released, as will be clearly understood.

The reference character 43 indicates a finishing-drum which is mounted on a transverse shaft 44 journaled in bearings 45 supported upon said side frames 1. Arranged beneath and concentric to the circumference of said finishing-drum 43 is a compression-plate 46, the same being preferably made of stiffly flexible sheet metal, and so supported as to be spaced from the surface of said finishing-drum to provide a passage through which the curled portion of dough passes subject to the operation of said compression-plate and finishing-drum in finally completing the dough-molding operations of the machine. After leaving the curling-drum 26 the curled sheet of dough drops upon the end of said compression-plate 46, and thus falls into contact with said finishing-drum, being carried around by the movement of the latter in contact with said compression-plate 46, the pressure of the latter upon the curled sheet of dough forcing the dough against the finishing-drum and rolling the same with lengthening effect upon the roll of dough so that the proper length of the molded dough body may be attained. The surface of said finishing-drum is convex from side to side, that is it is higher or of greater diameter at its central portion than at its ends, consequently as the dough moves in contact therewith, under the pressure of the compression-plate 46, the roll of dough becomes of less diameter in its central portion than at its ends. The purpose of so molding the dough is to provide for the natural shrinkage of the dough after it leaves the machine, so that as the dough shrinks together longitudinally, the shrinkage does not result in increasing the diameter and bulk of the center of the dough portion at the expense of the ends, but rather brings the diameter and bulk of the center of the dough portion to equality with that of the ends, hence resulting in a properly molded dough portion of the right length, and of uniform bulk and diameter throughout its length.

Said compression-plate 46 is mounted so as to be adjustable toward and away from the surface of said finishing-drum 43, whereby the pressure exerted by the same upon the dough in contact with said finishing-drum may be adjusted to conform to the consistency of the dough, and to secure the desired length of the finally molded dough portion. To this end the following devices are provided. Pivoted to the side frames 1 are oppositely extending swinging-frames 47, connected with which, so as to extend transversely between the free ends thereof, are cross-bars 48, each cross-bar having a pair of laterally projecting perforated ears or lugs 49. Connected with said compression-plate 46 adjacent to each end thereof, is a coupling-block 50 also provided with outwardly extending perforated ears or lugs 51, which are adapted to be registered with said ears or lugs 49 of said cross-bars 48, so that the respective perforations of the same are alined together for the insertion therethrough of a bolt 52. When desired a sliding-block 53 may be mounted to move or slide longitudinally upon said cross-bar 48, and to which one end of said bolt 52 is secured, said sliding-block 53 having a handle-portion 54 for manipulating the same, whereby said sliding-block may be moved longitudinally to insert or withdraw said bolt 52, to couple or uncouple the compression-plate 46 with said swinging-frames 47 which support the same.

The said compression-plate 46 being thus pivotally supported at or adjacent to its ends, it follows, that by swinging the said swinging-frames upwardly or downwardly the said compression-plate may be carried toward or away from the surface of said finishing-drum 43, and at the same time swinging the free ends of said compression-plate together or apart whereby the concentric relation of the same to the finishing-drum is maintained in all adjusted positions of the same. The means for moving said swinging-frames to accomplish the above mentioned results comprises, a transverse shaft 55, journaled in proper position in said side-frames 1, upon which are mounted cam-members 56 adapted to operatively engage the ends of pushing-arms 57 which are formed in connection with each swinging-frame 47. Secured upon said shaft 55 is a segmental gear 58 which is engaged by a worm 59 connected with a vertical shaft 60, said vertical shaft 60 having a hand-wheel 61 for rotating the same to turn said worm and thus oscillate said segmental-gear, shaft 55 and cam-members 56.

After the operation of the finishing-roll 43 is completed, and the molded dough portion is carried away from the compression-plate 46, it falls back upon a receiving-table 62 supported by arms 63 extending from said side frames, so as to support said table 62 adjacent to and in registration with said finishing-drum.

The several rolls and drums of the machine, as above described, all rotate in the directions of the arrows respectively associated therewith in Fig. 3 of the accompanying drawings. The means for driving the respective rolls and drums comprise a suitable train of gears connected with their respective shafts, the preferable arrangement and interconnection of which is as follows:—

Secured upon the shaft 25 is a pulley-wheel 64 for driving the same by means of a belt, or any other suitable driving means may be provided. Secured upon the opposite end of said shaft 25 is a spur-gear 65, which transmits its rotation through an idler gear 66 to another spur-gear 67 secured upon said shaft 6 driving the sheeting-roll 3. Secured upon the oposite end of said shaft 6 is a gear-wheel 68 which meshes with and drives a gear-wheel 69 secured to said driving-shaft 7 by means of which said sheeting-roll 4 is rotated. Said gear-wheel 69 meshes with and drives a gear-wheel 70 secured upon said shaft 27 whereby said curling-drum 26 is rotated, and said gear-wheel 70 meshes with and drives a gear-wheel 71 secured upon said shaft 44 whereby said finishing-drum 43 is rotated. Of course, it will be apparent that the driving means comprised in said train of gears above enumerated may be variously modified or related, or other driving means for the respective rolls and drums substituted if found desirable, without departing from the scope of my present invention.

I am aware, also, that some changes may be made in the general arrangements and combinations of the various devices and parts of my novel dough-molding machine, as well as in the details of the construction of the said parts, without departing from the scope of the present invention as set forth in the foregoing specification, and as defined in the claims which are appended thereto. Hence, I do not limit myself to the exact arrangements and combinations of the devices and parts as described in the said specification, nor do I confine myself to the exact details of the construction of the said parts as illustrated in the accompanying drawings.

I claim:—

1. In a dough-molding machine, the combination with a curling-drum of a curling-plate extending over a portion of the same and concentric thereto to provide a passage between the same and said curling-plate through which the dough travels, and means for adjusting said curling-plate toward or away from the surface of said curling-drum comprising, a stationary bridge-piece extending transversely above said curling-drum and provided with an internally screw-threaded opening, an adjusting-screw mounted in said opening to the lower end of which said curling-plate is attached, a pair of oppositely extending lever-arms pivoted to said bridge-piece the lower arms of which engage the opposite free ends of said curling-plate, a cam-means connected with the upper end of said adjusting screw so as to be vertically movable therewith, and adapted to engage the upper arms of said lever-arms to oscillate said lever-arms whereby the free ends of said curling-plate are depressed toward the surface of the curling-drum when said adjusting-screw is moved to carry the main body of said curling-plate toward said curling-drum.

2. In a dough-molding machine, the combination with a pair of sheeting-rolls comprising a fixed roll and a movable roll, of means for adjusting said movable roll toward or away from said fixed roll comprising, a supporting shaft upon which said movable roll is rotatably mounted, eccentric journal portions connected with the ends of said supporting shaft, a driving-shaft having a centrally disposed longitudinal opening in which one of said eccentric journal portions is mounted, a bearing in which the opposite eccentric journal portion is mounted, a bearing in which said driving shaft is mounted, a disk portion having a radial slot formed in its face, said disk portion being connected with the inner end of said driving-shaft, a stud projecting from the side of said movable roll and entering said slot of said disk portion, means for oscillating said supporting shaft on its eccentric journal portions, and means for locking said supporting shaft in desired adjusted position.

In testimony, that I claim the invention set forth above I have hereunto set my hand this 3rd day of December, 1914.

CHARLES A. THOMSON.

Witnesses:
GEORGE D. RICHARDS,
FRED'K H. W. FRAENTZEL.

Copies of this patent may be obtained for five cents each, by addressing the "Commissioner of Patents, Washington, D. C."